United States Patent
Ochiai et al.

(10) Patent No.: US 7,269,332 B2
(45) Date of Patent: Sep. 11, 2007

(54) INFORMATION REGENERATING UNIT

(75) Inventors: Yoshio Ochiai, Saitama (JP); Yasufumi Shinagawa, Saitama (JP); Koni Saito, Tokyo (JP)

(73) Assignee: Sony Corporation (JP)

( * ) Notice: Subject to any disclaimer, the term of this patent is extended or adjusted under 35 U.S.C. 154(b) by 1453 days.

(21) Appl. No.: 09/811,847

(22) Filed: Mar. 19, 2001

(65) Prior Publication Data

US 2001/0031126 A1 Oct. 18, 2001

(30) Foreign Application Priority Data

Mar. 21, 2000 (JP) ............................ P2000-078460
May 16, 2000 (JP) ............................ P2000-143815

(51) Int. Cl.
*H04N 5/91* (2006.01)

(52) U.S. Cl. ........................................ 386/77; 386/125
(58) Field of Classification Search .................. 386/46, 386/65, 77, 95, 111, 112, 125, 126; 348/14.01, 348/14.04, 373, 725, 838
See application file for complete search history.

(56) References Cited

U.S. PATENT DOCUMENTS

| 4,340,953 A | * | 7/1982 | Iwamura et al. ............. 369/126 |
| 5,612,732 A | * | 3/1997 | Yuyama et al. ........... 348/14.01 |
| 6,553,180 B1 | * | 4/2003 | Kikuchi et al. ................ 386/95 |
| 6,795,640 B1 | * | 9/2004 | Honda .......................... 386/95 |

* cited by examiner

*Primary Examiner*—John Miller
*Assistant Examiner*—Christopher Onuaku
(74) *Attorney, Agent, or Firm*—Lerner, David, Littenberg, Krumholz & Mentlik, LLP (57) ABSTRACT

An information regenerating unit has a semiconductor memory (2) containing predetermined compressed animation file data that have been electrically stored and mounted detachably to a main body; an MPEG decoder (7) for reading the compressed animation file data to apply uncompressing processes thereto, and mounted to the main body; an NTSC encoder (8) for converting the uncompressed regenerated image data to image data in accordance with a predetermined outputting system, and mounted to the main body; an LCD (3) for displaying the image data on a predetermined displaying region, and mounted to the main body or the outside thereof; and a microcomputer (6) for regenerating repeatedly the image data in each predetermined unit on the basis of the compressed animation file data, whereby the unit is downsized and reliability of data regenerated is improved.

16 Claims, 7 Drawing Sheets

INFORMATION REGENERATING UNIT

BACKGROUND OF THE INVENTION

1. Field of the Invention

The present invention relates to an information regenerating unit capable of regenerating file data, which has been stored in files in a storage medium.

2. Description of the Related Art

In recent years, it has been developed a purpose-built drive or audio-visuals, information appliances and the like housing a drive that can store computer data, image data, audio data and the like equipped with a small-sized storage medium mounting a solid state storage element, for example, flash-memory device or the like.

In this connection, however, there has been such a disadvantage in that deterioration arises on a recording tape due to secular changes in appliances wherein a recording tape is used as a recording medium, and further in that an operation for rewinding a tape is required in case of searching a certain data recorded on the tape, because there is a concept of a starting point as well as an end point for recording continuously data on the tape.

Furthermore, information has been magnetically recorded on a medium in an appliance wherein a recording tape or a video-compact disc (video CD) is used as a recording medium, so that a purpose-built magnetic recording head is required, besides a working part having a movable structure for reproducing data, and thus, there is such a disadvantage in that a degradation appears in the working part due to repetitive use.

Moreover, in an appliance wherein a recording tape or a video CD is utilized as a recording medium, a volume of such recording medium is bulky, so that a wide space is necessary for its storage, besides its appliance main body itself requires a capacity corresponding to such wide space, resulting in large-sized equipment.

SUMMARY OF THE INVENTION

The present invention has been made in view of the facts as described above involved in the prior art, so that an object of the present invention is to achieve a small-sized unit as well as to improve reliability in regenerated data processed by the unit.

According to the present invention, a main body of an information regenerating unit is provided with a sheet-like storage medium containing predetermined compressed animation file data that have been electrically stored.

The information regenerating unit comprises further an expanding means for reading the compressed animation file data to apply expanding processes thereto, and mounted to the main body; a converting means for converting the expanded regenerated image data to an image data in accordance with a predetermined outputting system, and mounted to the main body; a display means for displaying the image data on a predetermined displaying region in accordance with the predetermined outputting system, and mounted to the main body or the outside thereof; and a control means for regenerating repeatedly the image data in each predetermined unit on the basis of the compressed animation file data.

According to the information regenerating unit of the present invention as described above, it operates as follows.

The control means reads compressed image data and compressed voice data. The compressed image data and the compressed voice data thus read are supplied to the expanding means. The expanding means applies expanding processes to the compressed image data to produce regenerated image data, and applies also expanding processes to the compressed voice data to produce regenerated voice data.

The regenerated image data produced by the expanding means are supplied to the converting means, and video output signals of composite signal are outputted from the converting means. On the other hand, the regenerated voice data produced by the expanding means are supplied to the converting means, and audio output signals of analog signal are outputted from the converting means.

The video output signals of composite signal are supplied to the displaying means to display an image. The regenerated image is regenerated repeatedly in each predetermined unit by the control means based on the compressed animation file data.

BRIEF DESCRIPTION OF THE DRAWINGS

FIGS. 8A and 8B are diagrams each illustrating a constitution of protected data wherein FIG. 8A shows an ordinary MPEG data, and FIG. 8B shows an MPEG data for electronic POP.

DETAILED DESCRIPTION OF THE PREFERRED EMBODIMENTS

Preferred embodiments of the present invention will be described hereinafter by referring to the accompanying drawings wherein a sheet-like semiconductor memory having a sheet-like contour is used in preferred embodiments of the present invention as a storage medium, and in addition, a compressed image file can be repeatedly regenerated with respect to such sheet-like semiconductor memory in an information regenerating unit according to the present invention.

[Constitution of Information Regenerating Unit]

A constitution of an information regenerating unit of a preferred embodiment will be described in conjunction with FIG. 1 wherein an exterior appearance of an information regenerating unit 1 that can read and display data in connection with a sheet-like semiconductor memory which will be described hereinafter. An information regenerating system is composed of the information regenerating unit 1 and the sheet-like semiconductor memory 2 shown in FIG. 1.

The sheet-like semiconductor memory 2 is mounted by fitting a terminal section thereof into a detaching mechanism section disposed, for example, on an upper end of the information regenerating unit 1.

The information regenerating unit 1 is formed into a thin plate-like configuration wherein an LCD (Liquid Crystal Display) 3 for displaying image is placed on the front of the unit 1, a loud speaker 4 is disposed on an end of the unit, and an external output terminal 5 is provided on another end thereof.

Figure 1:
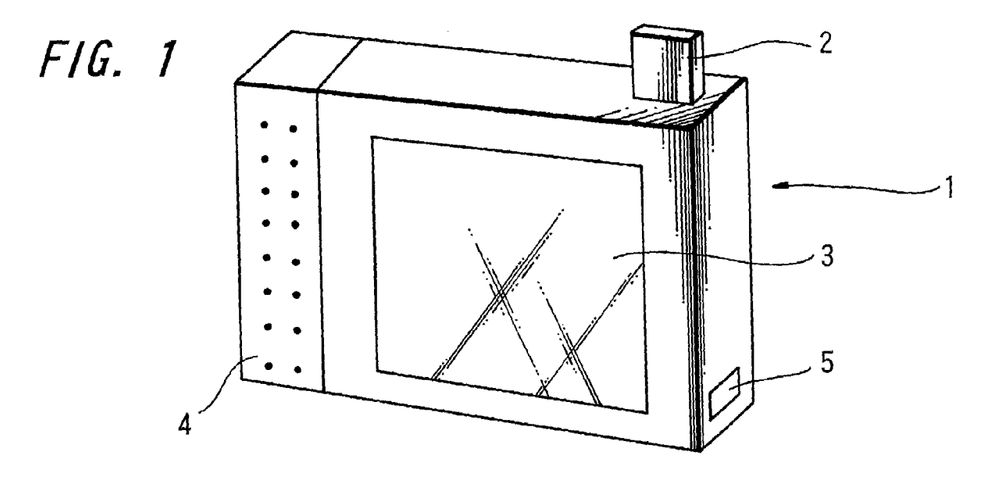
FIG. 1 is an outline view showing an information regenerating unit of an embodiment according to the present invention.

In FIG. 1, although an example wherein the LCD 3 and the speaker 4 have been integrally disposed on the information regenerating unit 1 is shown, the invention is not limited thereto, but the LCD and the speaker may be disposed outside the unit 1, and the information regenerating unit 1 may be connected with the external LCD and speaker through a cable extending from the external output terminal 5. In this connection, for instance, a four inch type display is used as the LCD 3.

Types of main data that can be handled by the information regenerating unit 1 as objects to be read repeatedly from the sheet-like semiconductor memory 2 are various, i.e., they are, for example, compressed animation data, voice data, hi-fi audio data (hereinafter referred to as "music data"), control data and the like. Furthermore, such data are not limited to those enumerated above, but static image data are also applicable.

In the present example, although a system for regenerating compressed animation data and compressed voice data (hereinafter referred optionally to as "voice data") as main data will be described herein for simplicity of the explanation, when the information regenerating unit 1 is provided with an input/output line as well as a processing line for static image, music and the like data, the unit 1 can function as a system for regenerating these data files as a matter of course.

According to an information regenerating unit of the present embodiment as mentioned above, advertising animation data can be repeatedly regenerated as compressed image data by the use of a sheet-like semiconductor memory, besides it becomes possible to replace data or a control program with respect to specified equipment as mentioned later.

Figure 2:
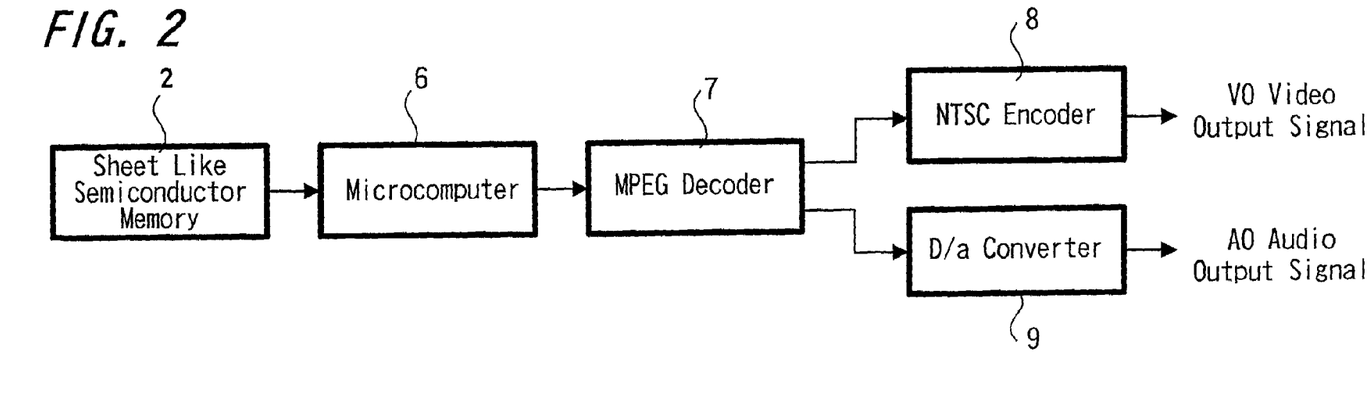
FIG. 2 is a block diagram showing a constitution of an information regenerating unit of the present invention.

FIG. 2 is a block diagram showing a constitution of an information regenerating unit wherein the information regenerating unit 1 comprises a sheet-like semiconductor memory 2 in which have been stored compressed animation data and compressed voice data, a microcomputer 6 for controlling operation, an MPEG decoder 7 for expanding the compressed animation data and the compressed voice data to produce image data and voice data, an NTSC encoder 8 for encoding the image data in NTSC system to output R (red), G (green) and B (blue) video output signals VO, and a D/A converter 9 for converting the voice data to analog data to output an audio output signal AO.

The information regenerating unit constituted as described above functions to act the following operations.

In FIG. 2, the microcomputer 6 reads compressed image data and compressed voice data, which have been stored in the sheet-like semiconductor memory 2. The compressed image data and the compressed voice data thus read are supplied to the MPEG decoder 7. The compressed image data and the compressed voice data are subjected to expansion process by means of the MPEG decoder 7 to produce regenerated image data and regenerated voice data.

The regenerated image data produced in the MPEG decoder 7 is supplied to the NTSC encoder 8 wherein the NTSC encoder 8 outputs a video output signal VO of a composite signal. On one hand, the regenerated voice data produced in the MPEG decoder 7 is fed to the D/A converter 9 wherein the D/A converter 9 outputs an audio output signal AO of an analog signal.

Figure 3:
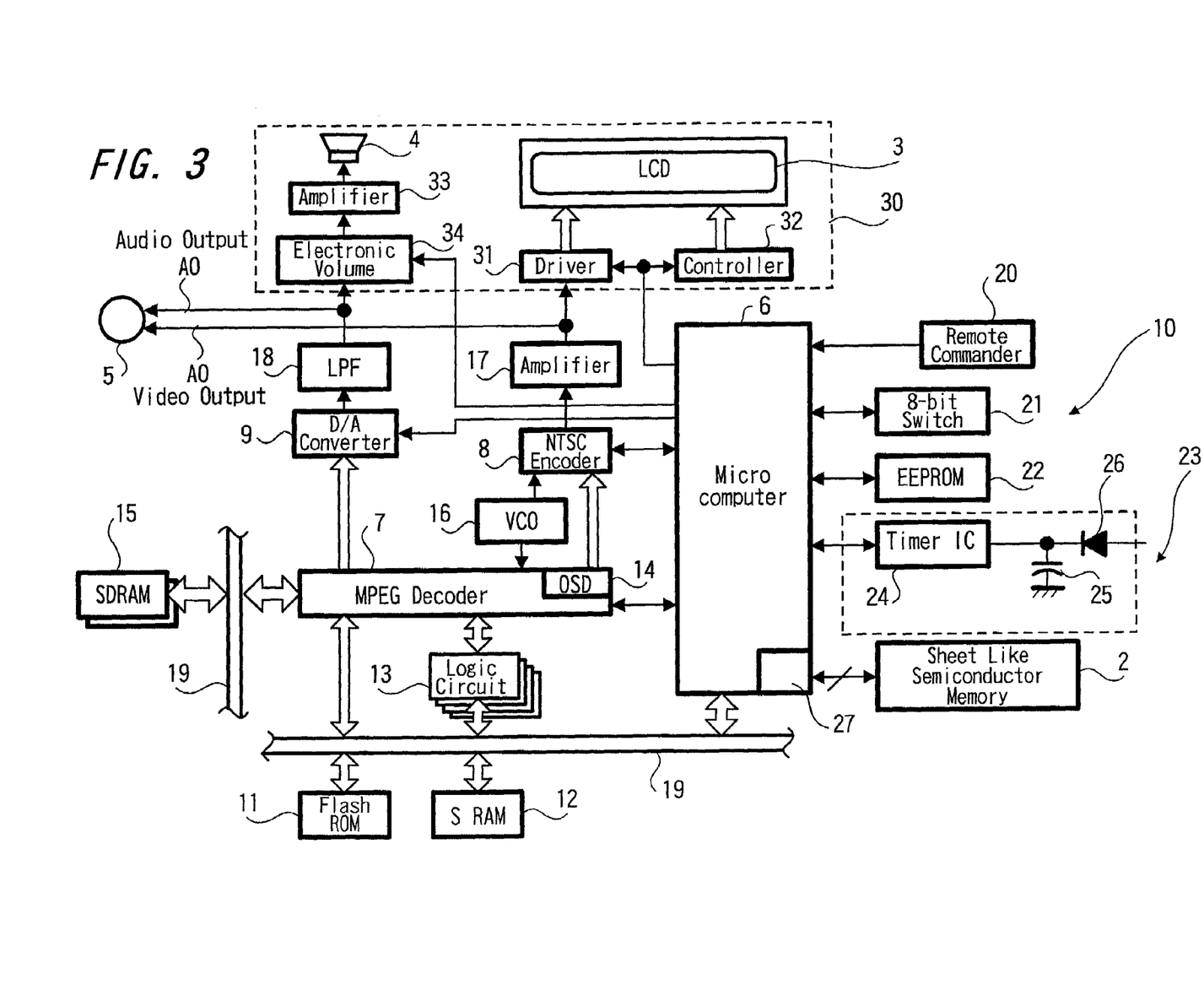
FIG. 3 is a block diagram showing a detailed constitution of an information regenerating unit of the present invention.

FIG. 3 is a block diagram showing a detailed constitution of an information generating unit according to the present invention wherein the information regenerating unit 1 is composed of a main body section 10 and an output unit 30. It is to be noted that the constitutions other than that shown in FIG. 2 will be principally described in FIG. 3, and the constitutions, which have already been explained in FIG. 2, are omitted.

The main body section 10 comprises a flash ROM 11 for storing control data and a control program, an SRAM 12 for sorting out the data which have been read from the sheet-like semiconductor 2, a logic circuit 13 for adjusting a timing of reading the data stored in the SRAM 12, and an 8-bits bus 19.

Furthermore, the main body section 10 comprises an OSD (On Screen Display) output section 14 for producing characteristic data used for displaying a menu inside the MPEG decoder 7 and the like use, and an SDRAM 15 for processing the MPEG decoder 7.

Moreover, the main body section 10 comprises a VCO 16 for producing operating frequency of 27 MHz used for the NTSC encoder 8, an amplifier 17 for amplifying an output from the NTSC encoder 8 to a predetermined level to output a video output signal VO, and LPF Low Pass Filter 18 for removing a noise contained in an output of the D/A converter 9.

The main body section 10 comprises further a remote commander 20 for receiving an infrared control signal from an external remote controller to supply a predetermined control signal to the microcomputer 6, an 8-bits switch 21 capable of inputting identification codes to be set up which will be mentioned later to the microcomputer 6, and EEPROM 22 capable of achieving non-volatile memory of identification code data set up.

Moreover, the main body section 10 contains a driver 26 for sheet-like semiconductor memory for interfacing with the same inside the microcomputer 6.

Further, the main body section 10 includes a timer unit 23 for making the microcomputer 6 to operate actions in accordance with the timer. The timer unit 23 is composed of a timer IC 24 for setting timer operation, an electric double layer capacitor C 25 having a comparatively long discharge period of time which can store a voltage for three days, and a diode 26 for preventing back flow of electric current.

On one hand, the output unit 30 comprises a driver 31 for supplying a driving signal to operate display of the LCD 3 on the basis of a video output signal VO, and a controller 32 for feeding synchronizing signal or the like to control a display timing of the LCD 3.

In addition, the output unit 30 comprises an electronic volume 34 for adjusting an output level of audio output signal AO based on control from the microcomputer 6, and an amplifier 33 for amplifying the audio output signal thus level-adjusted at a predetermined amplification factor.

In this connection, it is to be noted that the output unit 30 may also be constituted to selectively remove the timer unit 23 and the output unit 30. In this case, an external monitor and a speaker are connected with the main body section 10 through a cable from the external output terminal 5 instead of provision of the output unit 30.

Power source voltages in an information regenerating unit are produced in accordance with the following manner, respectively. First, 100 volt AC voltage is converted into 6 volt DC voltage via a converter, the 6 volt voltage is dropped to 2.5 volt voltage and 5 volt voltage by the use of a voltage regulator, while the 6 volt voltage is dropped to 3.3 volt voltage by the use of a D/D converter, and then the 3.3 volt voltage is raised to 12 volt voltage and 15 volt voltages.

For instance, these voltages are applied as follows. Namely, 2.5 volt voltage and 3.3 volt voltage are used for the MPEG decoder 7, 3.3 volt voltage is used for the microcomputer, 6, 5 volt voltage is used for the electric double layer capacitor 25, the amplifiers 17, 33 as well as the LPF 18, and 12 volt voltage and 15 volt voltage are used for the LCD 3, respectively.

Figure 4:
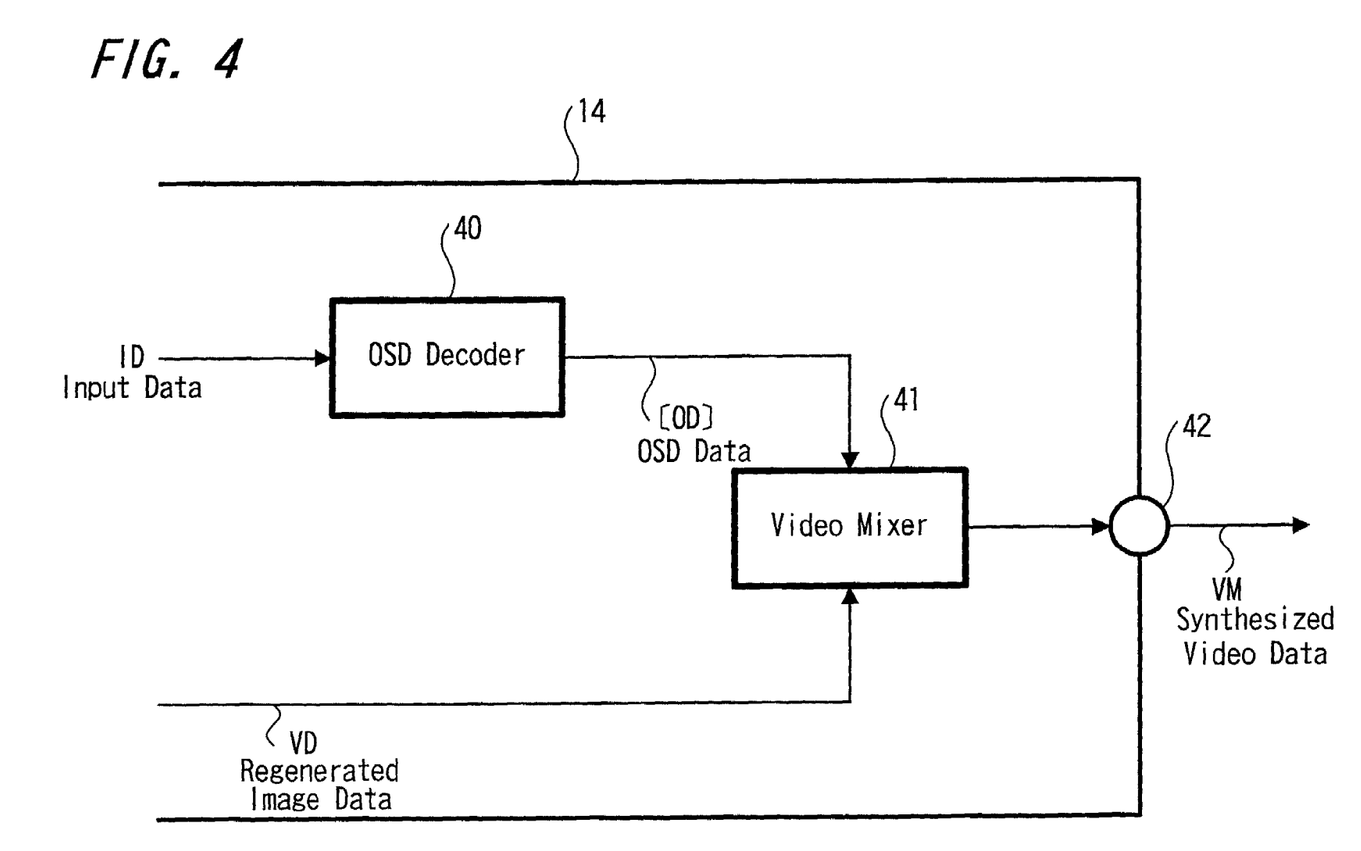
FIG. 4 is a block diagram showing an output section of an OSD decoder.

FIG. 4 is a block diagram showing an output section of an OSD decoder wherein the OSD output section 14 is composed of an OSD decoder 40 for decoding an input data ID to produce an OSD data OD of characteristic data in a menu screen and the like, a video mixer 41 for synthesizing the OSD data OD with a regenerated image data VD which has been image-expanded, and an output terminal 42 for outputting a synthesized video data VM.

In accordance with the manner as described above, it is possible that OSD data used for a menu screen and the like is synthesized with regenerated image data to output the data thus synthesized onto the LCD 3 in a displayable manner.

Furthermore, the invention is not limited to that described above, but it may be arranged in such that an OSD data supplied from the outside is synthesized with a regenerated data to output the resulting data without providing the OSD output section 14 in the MPEG decoder 7.

Operations in respective sections of the above-mentioned information regenerating unit will be described by referring to FIGS. 5 to 7.

Figure 5:
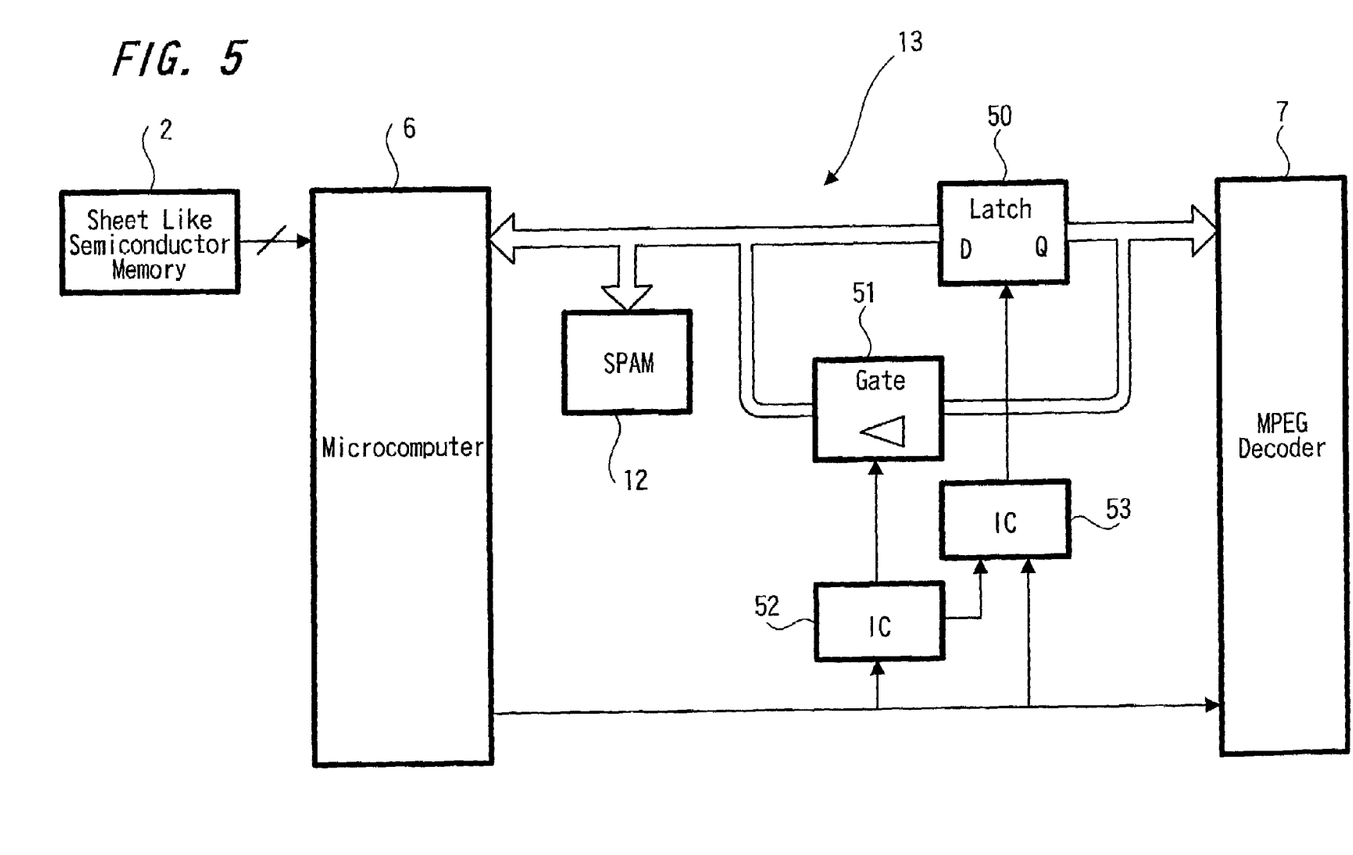
FIG. 5 is a block diagram showing an adjusting section for a transmission timing of regenerated data.

FIG. 5 is a block diagram showing an adjusting section for a transmission timing of regenerated data wherein the microcomputer 6 reads compressed image data and voice data which have been stored in the sheet-like semiconductor memory 2. In this case, a transmission rate of reading data from the sheet-like semiconductor memory 2 is, for example, 2.45-megabits per second at 512 byte unit. Moreover, reading of compressed image data and voice data stored in the sheet-like semiconductor memory 2 is implemented in accordance with three-wire serial system.

Compressed image data and voice data, which were read, are once stored at a sector unit in the SRAM 12. A storage capacity may appropriately be selected in response to a certain sector unit required for continuing real-time regeneration.

Then, compressed image data and voice data, which have been written in the SRAM 12, are read by means of the microcomputer 6, and the read data are transmitted to the MPEG decoder 7.

In case of the data transmission, a timing of data transmission between the microcomputer 6 and the MPEG decoder 7 is adjusted by means of the logic circuit 13.

More specifically, a master clock of the microcomputer operates at 10 MHz, and processing data are in 16 bits, while an internal clock of the MPEG decoder 7 operates at 110 MHz, and processing data are in 8 bits, so that it is required to return data twice from the MPEG decoder 7 to the microcomputer 6 with respect to data transmission between the microcomputer 6 and the MPEG decoder 7 per one time.

For this reason, provided are a latch 50, a gate 51 of returning data, IC 53 functioning to retain the latch 50 as well as to match a timing of output thereof, and IC 52 for matching a timing in output of the gate 51.

In the MPEG decoder 7, image data and voice data that have been compressed in accordance with MPEG 1 format are expanded. A macrocode for executing expansion processing in the MPEG decoder 7 has been written in the flash ROM 11, and the microcomputer 6 reads the macrocode upon power-up thereby to control the MPEG decoder 7. This macrocode is a code for effecting an operation corresponding to "PLAY" in reproducing equipment.

Figure 6:
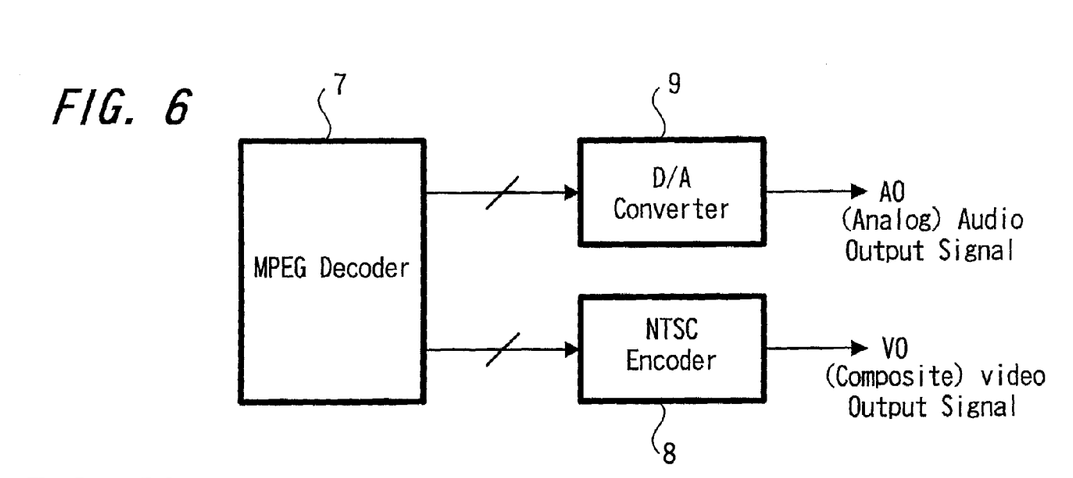
FIG. 6 is a block diagram showing an audio-video outputting section.

FIG. 6 is a diagram showing audio and video output sections wherein image data which were expanded in the MPEG decoder 7 are supplied to the NTSC encoder 8 as 8-bits parallel data wherein they are converted to R, G, and B composite signals, and outputted as video output signals VO.

On the other hand, voice data that were expanded in the MPEG decoder 7 are fed to the D/A converter 9, and they are converted to analog signals such as clock signals, L (left) signals, and R (right) signals to be outputted as audio outputted signals AO.

The VCO 16 shown in FIG. 3 produces a reference clock of data, and magnifies twice 13.5 MHz crystal oscillation frequency, so that 27 MHz reference clock frequency is supplied to the MPEG decoder 7 and the NTSC encoder 8.

A signal level of video output signal VO of composite signal is amplified twice (6 dB) by means of the amplifier 17 shown in FIG. 3, it is terminated at 75 ohms, and line-outputted from the external output terminal 5.

Moreover, the video output signal VO of composite signal is supplied also to the output unit 30 shown in FIG. 3 wherein vertical and horizontal timings are adjusted by the controller 32 to be outputted to the LCD 3.

An OSD display such as a menu screen or the like in the LCD 3 is carried out by the use of the OSD output section 14 mounted inside the MPEG decoder 7.

Furthermore, noise contained in analog audio output signal AO is removed by the LPF 18 shown in FIG. 3, and outputted from the external outputted terminal 5 through a line.

In addition, such analog audio output signal AO is fed also to the output unit 30 shown in FIG. 3 wherein a voice signal level of which is variably amplified by the electronic volume 34 and the amplifier 33 to be outputted to the speaker 4.

A level of the electronic volume 34 is controlled by the microcomputer 6 with an operation from an external remote controller through the remote commander 20.

As illustrated in FIG. 3, the timer unit 23 is disposed, whereby timer function of the timer IC 24 is maintained by backing up a power source voltage with the electric double layer capacitor 25.

Moreover, a power source voltage of the timer IC 24 is backed up by the electric double layer capacitor 25, whereby respective settings of timer such as present time, and alarm derived from the microcomputer 6 are memorized only during a back-up term of the timer IC 24 itself.

An example of timer operation by the timer IC 24 is, for example, such that an operation is started at two minutes before an opening hour (e.g., 10 a.m.) to display regenerated animation image on the LCD 3, while the regeneration is stopped at closing hour (8 p.m.).

In case of providing no timer unit 23, if the microcomputer 6 itself possesses timer function, such function may be utilized.

Figure 7:
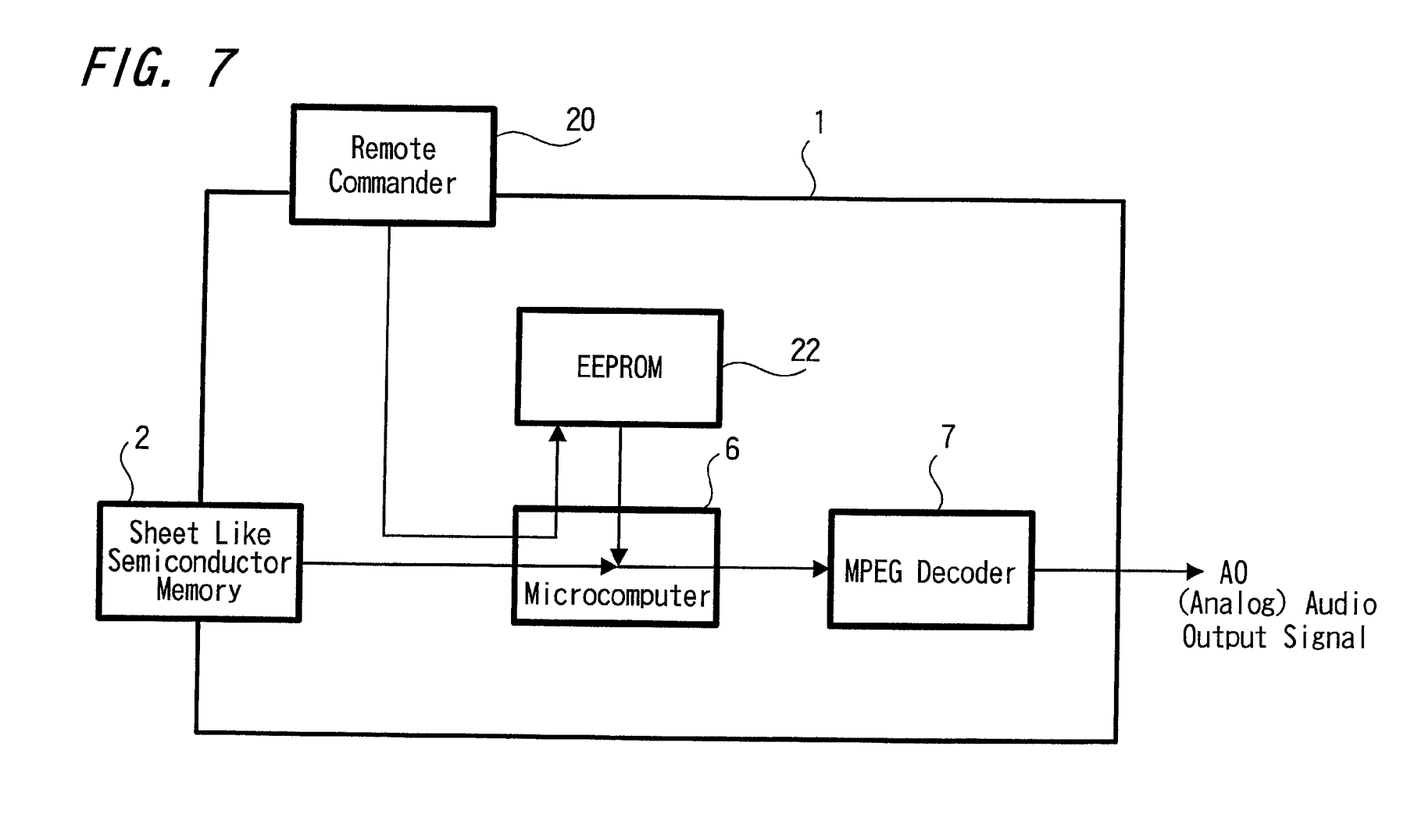
FIG. 7 is a block diagram illustrating an operation for setting up clients' codes.

FIG. 7 is a block diagram illustrating an operation for setting clients' codes as identification codes wherein the information regenerating unit 1 has such a protecting function that identity is detected between a client's code that was written already on a file data in the sheet-like semiconductor memory 2 by the use of a personal computer or the like and a client's code that has been previously set up in the EEPROM 22 of the information regenerating unit 1, so that if the client's codes in both cases are not identified with each other, regenerating operation is not started.

In this case, setting of clients' codes into a file data contained in the sheet-like semiconductor memory 2 is written by the use of a personal computer and the like.

As shown in FIG. 7, setting of clients' codes into the information regenerating unit 1 is made in accordance with such a manner that data to be set up is inputted to the microcomputer 6 by a manipulation from the 8-bits switch 21 and the external remote controller through the remote commander 20, whereby the data was set up in the EEPROM 22 from the microcomputer 6. The data set out once in the EEPROM 22 is stored therein in an unerasable manner, even if a power source is turned off.

In FIG. 7, when the power is turned on, the microcomputer 6 reads clients' codes stored in the EEPROM 22 and check the same against the clients' codes attached to compressed data read from the sheet-like semiconductor memory 2.

As a result, the microcomputer 6 starts regenerating operation in only the case where a client's code is identified, while when it is not identified, an error message is displayed on the LCD 3 by the use of the OSD output section 14.

Like the case as shown in FIG. 7, adjustment in picture quality of the LCD 3 is made in accordance with such a manner that adjustment data is inputted to the microcomputer 6 by a manipulation from the 8-bits switch 21 and the external remote controller through the remote commander 20, whereby the adjustment data is set up in the EEPROM 22 from the microcomputer 6.

The number of client's code may be determined, for example, in every makers manufacturing the information regenerating unit 1 and the sheet-like semiconductor memory 2, business concerns selling or leasing these products, and stores placing them on their storefronts so as to provide protecting functions. In this case, for instance, when 00 to FF are assigned with 2-bits, 256 codes can be set up.

As described above, for instance, a manufacturer sets up uniformly such a factory code used in the actual state is prohibited upon the information regenerating unit 1 and the sheet-like semiconductor memory 2 at the time of factory shipment.

Thereafter, business concerns or leasing companies those purchasing the information regenerating unit 1 and the sheet-like semiconductor memory 2 write own clients' codes in these products, and then the products are placed on the storefronts. Thus, the information regenerating unit 1 regenerates data in only the case where a client's code was identified.

In case of demonstrating new items, or servicing them, it may be arranged in such that regeneration can be made with respect to all the clients' codes by the use of the 8-bits switch 21 shown in FIG. 3.

Figure 8A:
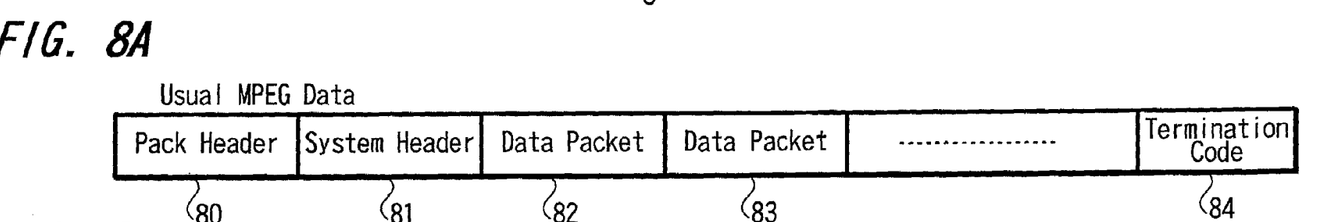
Figure 8B:
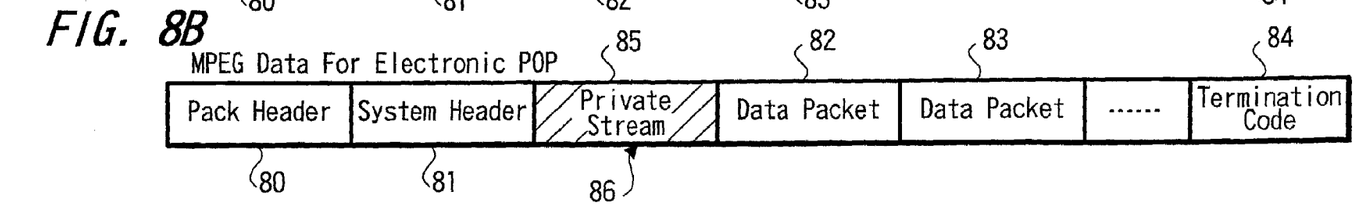

FIGS. 8A and 8B are block diagrams each illustrating a constitution of protecting data wherein the data constitution is made in conformity with MPEG 1 format.

FIG. 8A illustrates a usual MPEG data that is composed of a packed header 80, a system header 81, data packets 82, 83, . . . , and a terminating code 84.

FIG. 8B illustrates an MPEG data for electronic POP (Point of Purchase) applied to the present embodiment, and such usual MPEG data is composed of a packed header 80, a system header 81, a private stream packet 85, data packets 82, 83, . . . , and a terminating code 84.

The private stream packet 85 is a region 86 into which clients' codes are to be written. The MPEG decoder 7 in the information regenerating unit 1 of the present embodiment detects the private stream packet 85, and the microcomputer 6 reads a client's code written in the client's code writing region 86 in the private stream packet 85 to check the client's code read against a client's code set out in the EEPROM 22.

It is to be noted that the above-mentioned constitution of the information regenerating unit 1 is only an example, and the invention is not limited thereto. More specifically, any types of electronic equipment are applicable so far as a constitution thereof is in such that data can be regenerated in association with the sheet-like semiconductor memory 2.

[Outer Shape of Sheet-like Semiconductor Memory]

In the following, an outer shape of a sheet-like semiconductor memory being a storage memory of the present embodiment will be described.

A sheet-like semiconductor memory is the one composed of, for example, a sheet-like casing containing a memory device having, for example, a predetermined capacity. In the present embodiment, a flash memory is used as the memory device.

Extending over from a lower part in the front of the casing to the bottom side thereof, a terminal section having, for example, a plurality of electrodes is formed, and from the terminal section reading and writing operations are carried out with respect to a memory device contained in the casing. A left upper part of the casing along the plane direction is notched. This notched section functions to prevent erroneous insertion of a sheet-like semiconductor memory in its direction in the case when it is, for example, mounted to a detaching mechanism on a main body side of an information regenerating unit or the like case. Further, a sliding switch for preventing erroneous erasure of stored contents is disposed on the bottom side of the casing. The sheet-like semiconductor memory 2 applied to the present embodiment corresponds to a sheet area 55 mm×55 mm or less.

[Formatting of Sheet-Like Memory]

[Processing Hierarchy of Memory File System]

Then, formatting in a system wherein a sheet-like semiconductor memory is used as a storage medium will be described simply hereinafter.

As a file system processing hierarchy of a system wherein a sheet-like semiconductor memory is used as a storage medium, a file management processing layer, a logical address layer, physical address layer, and flash memory access are successively placed under an application processing layer.

With respect to processing for recording or regenerating recording data files or regenerating data files, all the application processing layer, the file management processing layer, the logical address layer, the physical address layer, and the flash memory access are used.

[Physical Data Construction]

A physical data construction of a flash memory being a storage element in a sheet-like semiconductor memory will be described.

A memory area as a flash memory is in such that a fixed length data unit called by the name of segment is the base. This segment is a size specified as 4 MB (megabytes) or 8 MB, and the number of segments in a flash memory differs dependent upon a capacity of the flash memory.

In this respect, types of a capacity of flash memory are 16 MB, 32 MB, 64 MB, and the maximum 128 MB.

[Concepts of Physical Address and Logical Address]

A physical address is applied to respective blocks. Such physical address is determined in accordance with a physical array order of blocks in a memory, and a relationship between a certain block and a physical address associated thereto remains unchanged.

There are a used block wherein block data have been stored, and a free block wherein block data are erased (i.e., non-recorded region).

A logical address is an address, which is allocated so as to follow a data written in a block.

A case where contents are rewritten or erased partially for updating data stored in a physical address from the above-described situation is considered. In such a case as described above, an updated data is not written again in the same block in a file system of flash memory, but the updated data is written into a free block, which is not used.

As a result, an alteration is made in such that a logical address corresponding to a physical address prior to an update corresponds to a physical address after updating a block to which was written an updated data.

In other words, it may be considered that physical address is an address applied inherently to a block, so that it is an address inherent to a written data of block unit, which is a tag along after so as to follow a data that was once written in the block.

[Logical-Physical Address Translation Table]

As is understood from the above description, when swap processing of a block is executed, a correspondence between physical address and logical address changes. Accordingly, a logical-physical address translation table indicating a correspondence between physical address and logical address is required to realize access for writing and reading data with respect to a flash memory.

[File Construction of Sheet-Like Semiconductor Memory]
[Directory Construction]

Figure 9:
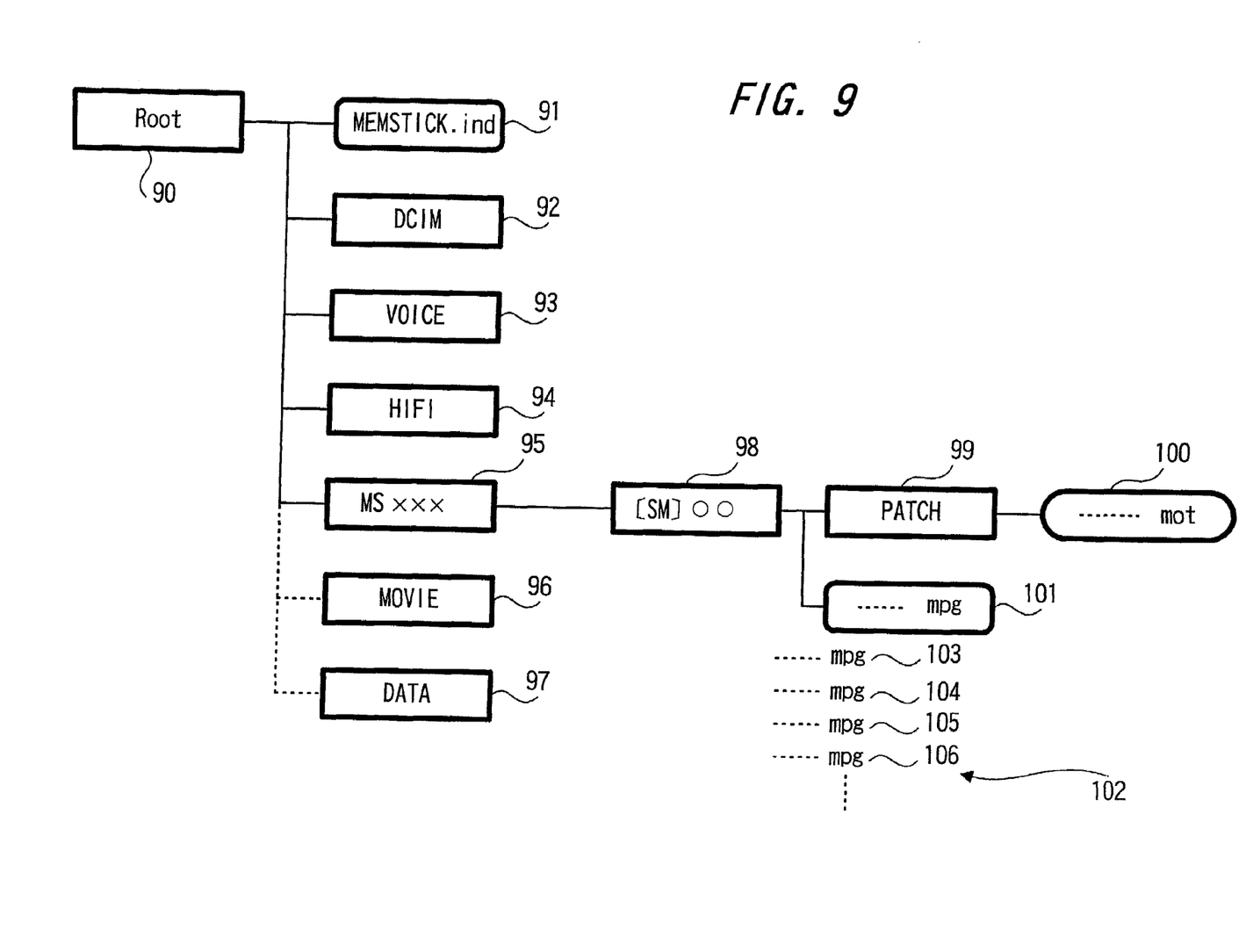
FIG. 9 is a diagram illustrating directories of a sheet-like semiconductor memory.

In the following, a file construction to be stored in the sheet-like semiconductor memory 2 will be described. First, an example of directory construction will be shown.

FIG. 9 is a diagram illustrating a directory of a sheet-like semiconductor memory.

As mentioned above, there are animation data, static image data, voice data, high-fidelity audio data (data for music), control data and the like as major data that can be handled in a sheet-like semiconductor memory. In this respect, as a directory construction, "MEMSTICK ind" (a sheet-like semiconductor memory file) 91, "DCIM" (a directory for containing static image file) 92, "VOICE" (a directory for containing voice file) 93, "HIFI" (a directory for containing music file) 94, MSxxx (a directory for containing maker's file (animation)) 95, "MOVIE" (a directory for containing animation file) 96, and "DATA" (a directory for containing information file) 97 are prepared, respectively, under a root directory 90 as shown in FIG. 9.

Particularly, "SMOO" (a directory for containing business concern's file) 98 is prepared as a subdirectory for the "MSxxx" (the directory for containing maker's file (animation) 95, and "PATCH" (a directory for containing control program) 99 is prepared as a subdirectory for the "SMOO" (a directory for containing business concern's file) 98.

Moreover, a " . . . mpg" (an animation file in each storefront) 101 is prepared in the "SMOO" (a directory for containing business concern's file) 98, and in addition, another " . . . mpg" (an animation file in every articles of commerce) 102 (further, 103 to 106 in response to articles of commerce) is prepared in the "SMOO" 98.

Besides, a " . . . mot" (a control program file) 100 is prepared in the "PATCH" (the directory for containing control program) 99.

According to the present embodiment as mentioned above, it becomes possible to replace an existing advertising animation data in a specified unit 1 by a fresh data in the form of compressed image data with the use of the sheet-like semiconductor memory 2.

Compressed animated data is electrically stored in the sheet-like semiconductor memory 2, so that no mechanical part including a movable section for regenerating data is required in the unit 1. Accordingly, there is no deterioration in the movable section, and in addition, downsizing of the whole unit becomes possible.

As described above, since compressed animated data is electrically stored in the sheet-like semiconductor memory 2, there is no deterioration of data in a compressed animation file. Accordingly, it is suitable for regenerating continuously data, whereby reliability in data regeneration is improved.

Further, since compressed animated data is electrically stored in the sheet-like semiconductor memory 2 as described above, rewriting of data is easily executed.

Moreover, a control program can be updated by the use of the sheet-like semiconductor memory 2, so that version upgrade of a program in the unit 1 can simply be carried out.

On one hand, adjustments in picture quality on the LCD 3 in the unit 1 can be implemented over a plurality of items by means of a control program being replaceable.

Furthermore, a control program may be allowed to dynamically function upon the microcomputer 6 contained in the unit 1 to rewrite a wrong program itself, and hence, it is applicable for countermeasures against a malfunction.

The sheet-like semiconductor memory 2 may be employed as an expanded ROM for storing control data to be used for the microcomputer 6 inside the unit 1.

On the other hand, a set-up menu screen is displayed on the LCD 3 by the use of the OSD output section 14 in the unit 1 to set out clients' codes on a side of the unit 1, while clients' codes on a memory side is set up in compressed animation file data of the sheet-like semiconductor memory 2 in such a manner that they are allowed to respond 1:1 to the clients' codes on the unit 1 side, and identification of both the clients' codes are made, whereby a protecting function can be executed.

A plurality of compressed animation file data have been previously stored in the sheet-like semiconductor memory 2, and the data are regenerated in accordance with either an order that has been previously determined or a random order, whereby it may execute regeneration of a program.

Moreover, a regenerating time zone before noon or in afternoon has been previously set out by the use of the timer unit 23, whereby a timer function may be realized.

Since a compressed animation file data is regenerated in real time from the sheet-like semiconductor memory 2, no buffer memory having an equivalent capacity to that of the sheet-like semiconductor memory is required.

When two of detachable sections are provided with respect to a sheet-like semiconductor memory 2 in the unit 1, it becomes possible to take out alternately animation data from two sheet-like semiconductor memories 2 in a continuous manner.

As a storage medium to be applied to the information regenerating unit 1 of the present embodiment, it is not restricted to the sheet-like semiconductor memory 2 as shown in FIG. 1, but any solid memory medium having other configurations (memory chip, memory card, memory module and the like) may be applicable.

Furthermore, a detailed prescription or the like in formatting for a file system that has been explained hereinabove may be modified in response to, for example, its actual application.

A variation in capacity of a flash memory is also not limited to that mentioned above. As a matter of course, a memory element of a storage medium in the present embodiment is not restricted to a flash memory, but any memory element such as other types of volatile dynamic RAM, static RAM and the like is applicable.

An information regenerating unit according to the present invention provides such advantages that since an animation is regenerated repeatedly by the use of a sheet-like storage medium, the unit can be downsized, that repeated regeneration of animation can be realized with excellent reliability, because a manner of storage is electrical storage, that no data is deteriorated in a storage medium even if regeneration is carried out over a number of times, and that since there is no mechanical part including a movable section in the case when the unit is applied to an electronic POP and the like, whereby a cost for maintenance can be reduced, so that a wide space for installation of unit is not required.

Besides, since a sheet-like storage medium is used, there is an advantage of realizing a unit of excellent hand-held nature.

In addition, since it is possible to update a control program of unit from a sheet-like storage medium, there is such an advantage that version upgrading or trouble shooting of the program after shipment can be made without disassembling the unit.

Moreover, a control command, which does not contain in a unit can be executed by the use of a control program introduced from a sheet-like storage medium, so that there is such an advantage that a control state inside the unit is checked over, and the result can be displayed on a displaying means as a version number as a result of synthesizing character data representing such result with image data by the use of OSD function.

Furthermore, there are such advantages that a plurality of the above-described image data are regenerated in accordance with an appropriate order, whereby a program can be regenerated, and that timer operation becomes also possible.

Besides, when regeneration is alternately made from a plurality of sheet-like semiconductor memories, such an advantage that continuous regeneration for a long period of time becomes possible is obtained.

In addition, there is such an advantage that a unit is allowed to respond 1:1 to a file data contained in a sheet-like storage medium to assign an identification number, whereby it becomes possible to achieve regenerating operation with respect to a specified user or a specified file.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An information regenerating unit comprising:
   a plurality of storage media configured to be mounted detachably to a main body, said plurality of storage media containing predetermined file data that have been electrically stored;
   expanding means mounted to said main body for applying a regenerating process to said file data and for reading said file data;
   converting means mounted to said main body for converting said regenerated image file data to image data in accordance with a predetermined outputting system;
   display means mounted to said main body for displaying said image data on a predetermined displaying region in accordance with said predetermined outputting system; and
   control means for repeatedly regenerating said image data in predetermined units based upon said file data,
   in which said file data stored in said plurality of storage media are read alternately so that said image data are continuously regenerated.

2. The information regenerating unit according to claim 1, wherein each of said plurality of storage media is a sheet-like semiconductor nonvolatile memory.

3. The information regenerating unit according to claim 1, wherein said plurality of storage media stores a control program for controlling an operation of said main body in a manner capable of updating said control program with respect to said main body.

4. The information regenerating unit according to claim 3, wherein said main body displays an optional operating condition on said displaying means as an operation condition image by executing said control program.

5. The information regenerating unit according to claim 4, wherein said display of said operating condition image is performed by synthesizing predetermined character data with said image data.

6. The information regenerating unit according to claim 3, wherein said main body executes a control command not contained in said main body by performing said control program.

7. The information regenerating unit according to claim 1, further comprising setting means for setting an order in accordance with which a plurality of said image data are regenerated, wherein each of said plurality of said image data are regenerated in accordance with said order.

8. The information regenerating unit according to claim 1, further comprising timer means for setting a starting time and a terminating time for regenerating said image data, wherein said image data are regenerated in accordance with an optional time.

9. The information regenerating unit according to claim 1, further comprising temporary storage means for temporarily storing said file data at a sector unit of storage of said plurality of storage media, wherein said file data are read in real time mode from said plurality of storage media to temporarily store said data in said temporary storage means, said image data being regenerated while reading said file data in said real time mode.

10. The information regenerating unit according to claim 1, further comprising:
   a loudspeaker mounted on said main body or outside said main body for regenerating voice data;
   said plurality of storage media operable for storing electrically compressed voice file data;
   said expanding means operable for applying a regenerating process to said compressed voice file data and for reading said compressed voice file data; and
   said converting means operable for converting said regenerated voice data to voice data in accordance with a predetermined outputting system.

11. The information regenerating unit according to claim 1, further comprising a storing region for storing a plurality of identification codes of storage file data disposed on said file data; and storing means for storing a plurality of main body identification codes disposed on said control means, wherein said file data in said plurality of storage media that are identified are read when one of said plurality of storage file data identification codes is identified by one of said plurality of main body identification codes, and said image data are regenerated.

12. The information regenerating unit according to claim 11, wherein said main body identification code is rewritable.

13. The information regenerating unit according to claim 12, wherein rewriting of said main body identification code is performed using said plurality of storage media.

14. The information regenerating unit of claim 1, in which the file data is compressed animation file data.

15. An information regenerating unit comprising:
a plurality of storage media mounted detachably to a main body, said plurality of storage media containing predetermined compressed animation file data that have been electrically stored;
expanding means mounted to said main body for applying a regenerating process to said compressed animation file data and for reading said compressed animation file data;
converting means mounted to said main body for converting said regenerated image animation file data to image data in accordance with a predetermined outputting system;
display means mounted to said main body for displaying said image data on a predetermined displaying region in accordance with said predetermined outputting system; and
control means for repeatedly regenerating said image data in predetermined units based upon said compressed animation file data,
in which said compressed image file data stored in said plurality of said storage media are read alternately so that said image data are continuously regenerated.

16. An information regenerating unit comprising:
a storage medium mounted detachably to a main body, said storage medium containing predetermined compressed animation file data that have been electrically stored;
expanding means mounted to said main body for applying a regenerating process to said compressed animation file data and for reading said compressed animation file data;
converting means mounted to said main body for converting said regenerated image animation file data to image data in accordance with a predetermined outputting system;
display means mounted to said main body for displaying said image data on a predetermined displaying region in accordance with said predetermined outputting system;
control means for repeatedly regenerating said image data in predetermined units based upon said compressed animation file data;
a storing region for storing a plurality of identification codes of storage file data disposed on said compressed image file data; and
storing means for storing a plurality of main body identification codes disposed on said control means,
in which said compressed animation file data in said storage medium that are identified are read when one of said plurality of storage file data identification codes is identified by one of said plurality of main body identification codes, and said image data are regenerated,
in which said main body identification code is rewritable,
in which rewriting of said main body identification code is performed using a change-over switch with respect to said storing means for main body identification codes.

* * * * *

UNITED STATES PATENT AND TRADEMARK OFFICE
CERTIFICATE OF CORRECTION

PATENT NO. : 7,269,332 B2  Page 1 of 1
APPLICATION NO. : 09/811847
DATED : September 11, 2007
INVENTOR(S) : Yoshio Ochiai, Yasufumi Shinagawa and Koni Saito It is certified that error appears in the above-identified patent and that said Letters Patent is hereby corrected as shown below:

On the Title page (75) of the patent, in the Inventors section, "Koni" should read --Koji--;

In Column 1, Line 10, "it has" should read --there have--;

In Column 7, Line 43, delete "those";

In Column 8, Line 10, delete the first occurrence of "in";

In Column 8, Line 58, delete "in";

In Column 10, Line 38, "is" should read --are--;

In Column 10, Line 42, "are" should read --is--;

In Column 12, Line 17, "stores" should read --store--; and

In Column 12, Line 37, "are" should read --is--.

Signed and Sealed this

Nineteenth Day of August, 2008

JON W. DUDAS
*Director of the United States Patent and Trademark Office*